(12) United States Patent
Grundke

(10) Patent No.: US 6,820,516 B2
(45) Date of Patent: Nov. 23, 2004

(54) ADJUSTING DEVICE FOR WHEEL BRAKE CABLES OF A MANUALLY-OPERATED PARKING BRAKE

(75) Inventor: Edgar Grundke, Ditzingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 28 days.

(21) Appl. No.: 10/237,721

(22) Filed: Sep. 10, 2002

(65) Prior Publication Data

US 2003/0075000 A1 Apr. 24, 2003

(30) Foreign Application Priority Data

Oct. 19, 2001 (DE) .......................... 101 51 766

(51) Int. Cl.[7] .............. F16C 1/10; B60L 7/00; B60T 7/08; B60T 13/74; F16D 65/30
(52) U.S. Cl. ................. 74/501.5 R; 74/502.4; 74/502.6; 188/2 D; 188/204 R; 188/16
(58) Field of Search ............ 74/502.4, 502.6, 74/501.5 R, 471 XY; 188/2 D, 204 R, 16, 271

(56) References Cited

U.S. PATENT DOCUMENTS

| 2,155,042 | A | * | 4/1939 | Gerndt .................... 188/204 R |
| 2,912,072 | A | | 11/1959 | Jones |
| 3,786,689 | A | * | 1/1974 | Houk .................... 74/471 XY |
| 3,792,746 | A | * | 2/1974 | Phillips .................... 180/271 |
| 3,899,048 | A | * | 8/1975 | Huvers .................... 188/16 |
| 4,569,112 | A | | 2/1986 | Dussault |
| 4,889,007 | A | * | 12/1989 | Senft et al. .................... 74/506 |
| 6,244,129 | B1 | * | 6/2001 | Krug et al. ............ 74/501.5 R |
| 6,305,238 | B1 | * | 10/2001 | Gabas .................... 74/502.6 |
| 6,662,910 | B2 | * | 12/2003 | Grundke ................. 188/204 R |
| 6,681,900 | B2 | * | 1/2004 | Wang .................... 188/2 D |

FOREIGN PATENT DOCUMENTS

| DE | 3408058 A1 | 9/1985 | |
| DE | 3741529 | 6/1989 | |
| DE | 3741530 A1 * | 6/1989 | ............ 74/502.4 |
| DE | 4401084 | 8/1995 | |
| FR | 645291 | 11/1927 | |
| WO | 95/19283 | 7/1995 | |

OTHER PUBLICATIONS

European Search Report EP 02019527, Dec. 13, 2002.

* cited by examiner

Primary Examiner—Vinh T. Luong
(74) Attorney, Agent, or Firm—Crowell & Moring LLP

(57) ABSTRACT

In an adjusting device for wheel brake cables of a manually-operated parking brake, said cables are held in a yoke and are connected by means of the deflection element to a cable, which is fastened to a foot pedal for actuation. Through the intermediary of an adjustable compensating element, the yoke is braced by means of a spring element against a bracing member on a pull rod. The compensating element can be fixed by means of a setscrew in different inclined positions in relation to the bracing member; and, corresponding to this bracing member, the compensating element can be displaced on the pull rod and can be fixed on the pull rod by means of a threaded nut.

10 Claims, 2 Drawing Sheets

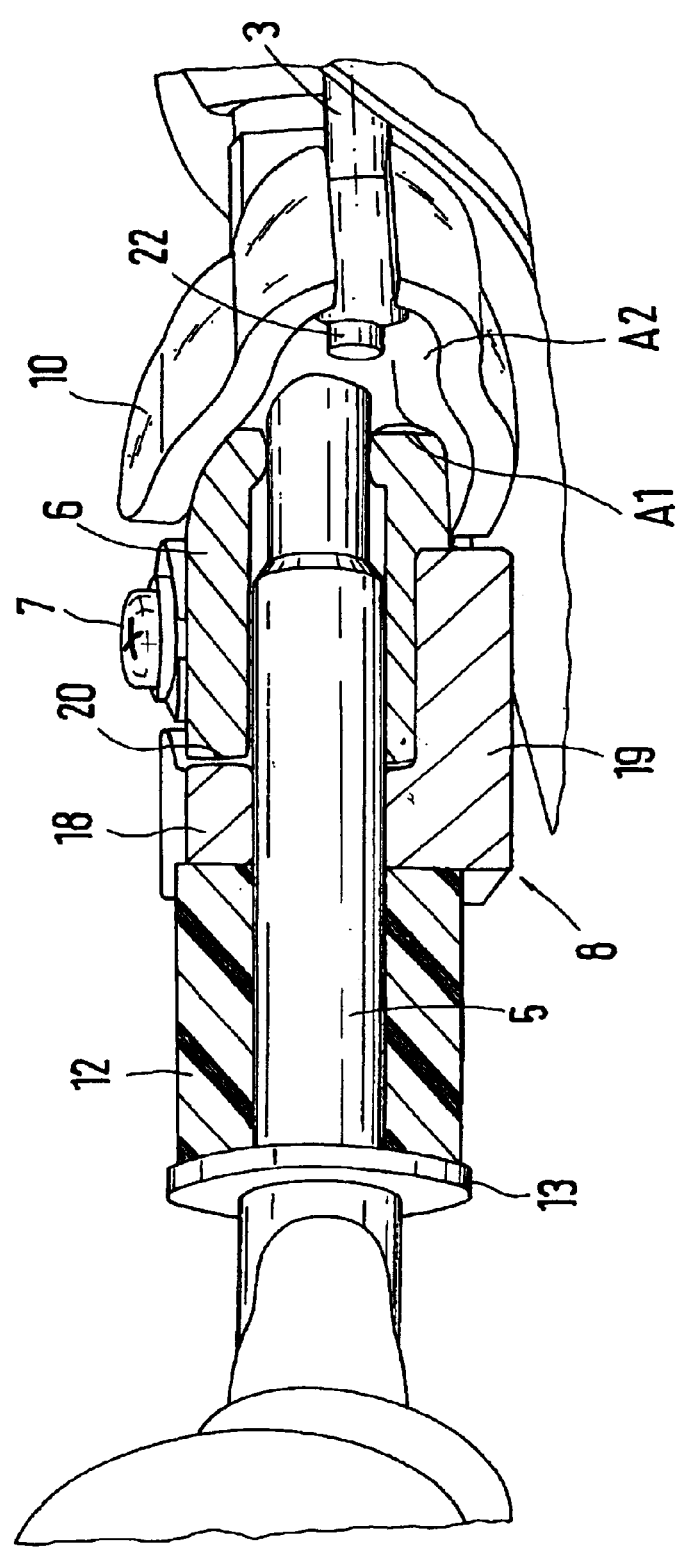

ADJUSTING DEVICE FOR WHEEL BRAKE CABLES OF A MANUALLY-OPERATED PARKING BRAKE

This application claims the priority of Federal Republic of Germany Patent Document No. 101 51 766.1, filed Oct. 19, 2001, the disclosure of which is expressly incorporated by reference herein.

BACKGROUND AND SUMMARY OF THE INVENTION

The invention relates to an adjusting device for wheel brake cables of a manually-operated parking brake.

U.S. Pat. No. 2,912,072 discloses an adjusting device for brake cables. The adjusting device comprises a yoke, from which a brake cable can be suspended on any side. The yoke is fixed on a pull rod by means of a tensioning nut, which can be screwed on as a function of the cable elongation.

An object of the invention is to provide an adjusting device for wheel brake cables of a manually-operated parking brake, with which adjusting device the length and/or tolerances of a projecting cable can be adjusted in a simple manner.

The advantages of the present invention include that different lengths of the brake cables and tolerances, due to installation into the motor vehicle, can be compensated for. This is done by bracing a yoke of the adjusting device through an adjustable compensating element against a bracing member on a pull rod using a spring element. The compensating element can be fixed with a setscrew in different inclined positions in relation to the bracing member. Corresponding to this bracing member, the compensating element is displaced on the pull rod and can be connected to it with a threaded nut.

Owing to the adjustment options of the compensating element, the actual lengths of both brake cables can be taken into consideration so that they are held in the yoke taut and without slack.

To swivel the compensating element on the pull rod, it has a so-called guide slot or the like. The setscrew is arranged in a lateral slot of the compensating element, and the compensating element on the pull rod can be swivelled into inclined positions, which is limited on both sides of the pull rod, in relation to the bracing member. This design enables a sufficiently large swivel angle of the compensating element on both sides so that cables of different lengths can be received.

The compensating element includes a rounded-off back, which is disposed in a curved, corresponding rounding-off of the bracing member. Furthermore, the yoke on the pull rod can be braced by means of the threaded nut against the compensating element, which exhibits a bracing surface, which is turned toward the yoke and which lies opposite another corresponding bracing surface, which lies inside. In particular, the cross section of the yoke has a U-shaped profile; and the compensating element is arranged in this profile and is braced on the inside against the other bracing surface. In this manner a fixed arrangement and bracing of the yoke in any preset position of the compensating element is guaranteed.

The pull rod also has a spring element, which comprises, for example, an elastomer sleeve, which is arranged between a retaining washer, braced against the pull rod, and the compensating element on the pull rod. This spring element has the advantageous effect that force can be applied against the compensating element and thus against the yoke and against the threaded nut on the pull rod.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross sectional view of the adjusting device.

DETAILED DESCRIPTION OF THE DRAWINGS

Figure 1:
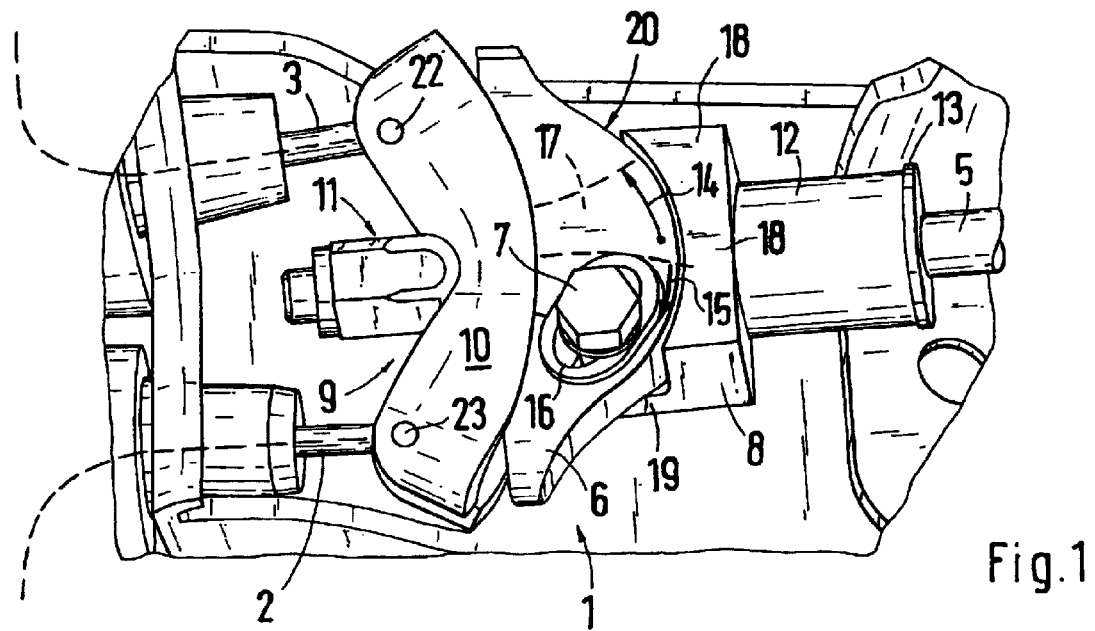
FIG. 1 is a top view of an adjusting device with a spring element, bracing member, compensating element and yoke, all of which are arranged on a pull rod, for brake cables.
Figure 2:
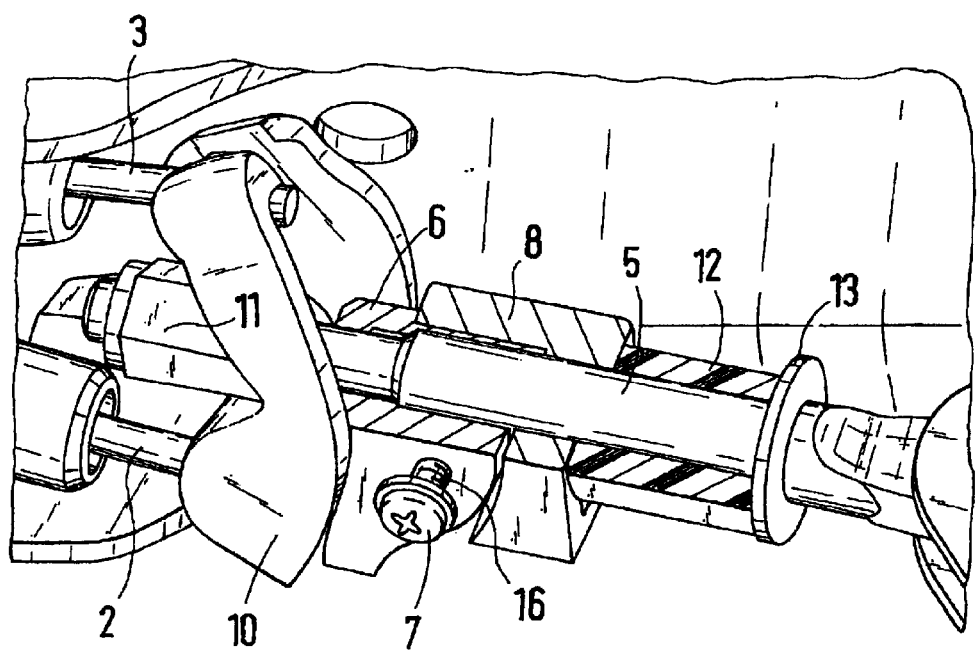
FIG. 2 is a perspective view of the adjusting device, according to FIG. 1.

FIG. 1 illustrates an adjusting device 1 for brake cables 2, 3 of a manually-operated parking brake, which includes a brake pedal. The brake pedal is provided with a Bowden cable with a deflection unit and is connected to a pull rod 5, which includes the adjusting device 1.

The adjusting device 1 comprises in essence a compensating element 6, which is arranged on the pull rod 5 and which is connected to a bracing member 8 by a setscrew 7. On the free end 9 of the pull rod 5 there is a yoke 10, which braces itself against the compensating element 6. On the free end 9 of the pull rod 5, the unit, comprising the yoke 10, the compensating element 6 and the bracing member 8, is forced against a spring, such as an elastomer spring 12, arranged on the pull rod 5, with a threaded nut 11, where the spring 12 rests or braces itself against a retaining washer 13.

To compensate for different lengths of the brake cables 2, 3 or to compensate for the tolerances, the compensating element 6 can be swivelled, after the threaded nut 11 and the tightening screw 7 have been loosened, in the directions of the arrows 14, 15 into so-called inclined positions. To this end, the setscrew 7 is arranged in a lateral elongated slot 16 of the compensating element 6. The ability to swivel the compensating element 6 on the pull rod 5 is achieved with a slot guide 17 (FIG. 1).

Following positioning of the compensating element 6, the setscrew 7 is fixed in the bracing member 8. The bracing member 8 has an angular shape in its cross section and a rounded bracing leg 18 and a bearing leg 19 for the compensating element 6. A rounded back 20 of the compensating element 6, which corresponds with the bracing leg 18, can be swivelled in the rounded bracing leg 18.

With the suspended brake cables 2, 3, the yoke 10 braces itself against the compensating element 6, which is positioned in accordance with the lengths of the cable.

The yoke 10 has a generally U-shaped profile in its cross section, and the compensating element 6 is arranged between the legs of this profile and is braced on the side of the yoke 10 with its bracing surface A1 at the bracing surface A2. That means that in an inclined position of the compensating element 6, the yoke 10 also assumes a corresponding inclined position, like the compensating element 6.

The tolerances can be compensated preferably by turning the yoke 10 with the suspended brake cables 2 and 3 until the projecting cables at the other end are the same length. By tightening the setscrew 7, the compensating element 6 is fixed in its position in accordance with the yoke 10 at the bracing member 8, thus fixing the cable nipples 22, 23.

By twisting the threaded nut 11 on the pull rod 5, the yoke 10 with all of the cable nipples 22, 23 is turned forward or backward. Thus, the projection at the other end of the cable changes. At the same time, the spring element 12 forces the yoke 10 with the bracing member 8 and the compensating element 6 against the threaded nut 11. Thus, a preset inclined position of the yoke 10 is maintained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjusting device for wheel brake cables of a manually-operated parking brake, said cables are held in a yoke and are connected to a cable using a deflection element, which is fastened to a foot pedal, wherein through the intermediary of an adjustable compensating element the yoke is braced by a spring element against a bracing member on a pull rod, wherein the compensating element can be fixed by a setscrew in different inclined positions in relation to the bracing member; and, corresponding to the bracing member, the compensating element can be displaced on the pull rod and can be fixed by a threaded nut, and wherein the setscrew is arranged in a lateral slot of the compensating element, and said compensating element on the pull rod can be swivelled, limited on both sides of the pull rod, in relation to the bracing member.

2. Adjusting device of claim 1, wherein the compensating element includes a rounded-off back, which is disposed in a corresponding, curved rounding-off of the bracing member.

3. Adjusting device of claim 2, wherein the yoke on the pull rod can be braced by the threaded nut against the compensating element, which includes a bracing surface, which is turned toward the yoke and which lies opposite an internal corresponding additional bracing surface in the yoke.

4. Adjusting device of claim 3, wherein the spring element comprises an elastomer sleeve, which is arranged between a retaining washer, braced against the pull rod, and the compensating element on the pull rod.

5. Adjusting device for wheel brake cables of a manually-operated parking brake, said cables are held in a yoke and are connected to a cable using a deflection element, which is fastened to a foot pedal, wherein through the intermediary of an adjustable compensating element the yoke is braced by a spring element against a bracing member on a pull rod, and wherein the spring element comprises an elastomer sleeve, which is arranged between a retaining washer, braced against the pull rod, and the compensating element on the pull rod.

6. An adjusting device for wheel brake cables of a manually-operated parking brake, the device comprising:

a yoke connected to the brake cables;

a spring element;

a bracing member;

an adjustable compensating element, wherein the yoke is braced by the spring element through the adjustable compensating element against the bracing member on a pull rod of the wheel brake; and a threaded nut and a screw, wherein the compensating element is pivotable relative to the bracing member and is fixable by the screw in a pivoting position in relation to the bracing member, wherein the bracing member and the compensating element are displaceable along the pull rod by adjusting the threaded nut, and wherein the compensating element includes a lateral slot, and the screw is screwed on the bracing member and arranged in the lateral slot, and wherein the pivoting of the compensating element relative to the bracing member is limited by the length of the lateral slot.

7. The adjusting device of claim 6, wherein the compensating element includes a rounded-off back, and the bracing member includes a corresponding curved rounding-off, and wherein the rounded-off back of the compensating element is engaged with the curved rounding-off of the bracing member.

8. The adjusting device of claim 7, wherein the compensating element includes a bracing surface, and the yoke includes an internal bracing surface, and wherein the yoke is braced by the threaded nut against the compensating element with the bracing surface of the compensating element engaged with the internal bracing surface of the yoke.

9. The adjusting device of claim 8, wherein the spring element comprises an elastomer sleeve, which is arranged between a retaining washer, braced against the pull rod, and the compensating element.

10. An adjusting device for wheel brake cables of a manually-operated parking brake, the device comprising:

a yoke connected to the brake cables;

a spring element;

a bracing member; and an adjustable compensating element, wherein the yoke is braced by the spring element through the adjustable compensating element against the bracing member on a pull rod of a wheel brake, and wherein the spring element comprises an elastomer sleeve, which is arranged between a retaining washer, braced against the pull rod, and the compensating element.

\* \* \* \* \*